(12) United States Patent
Shantz et al.

(10) Patent No.: US 6,334,571 B1
(45) Date of Patent: Jan. 1, 2002

(54) THIN INTERLAYER FRICTION WELDING

(75) Inventors: Ronald B. Shantz, Sheffield; James R. Huber, Cambridge, both of (CA)

(73) Assignee: A.R.D. Industries Ltd., Cambridge (CA)

( * ) Notice: Subject to any disclaimer, the term of this patent is extended or adjusted under 35 U.S.C. 154(b) by 0 days.

(21) Appl. No.: 09/713,329

(22) Filed: Nov. 16, 2000

Related U.S. Application Data

(60) Provisional application No. 60/166,310, filed on Nov. 19, 1999.

(51) Int. Cl.[7] ............................ B23K 31/02; B23K 20/12
(52) U.S. Cl. ................... 228/256; 228/112.1; 228/113; 228/114.5; 228/114; 29/470.3
(58) Field of Search ............................ 228/112.1, 113, 228/114, 114.5, 250, 256; 29/470.3

(56) References Cited

U.S. PATENT DOCUMENTS

| | | | |
|---|---|---|---|
| 3,576,067 A | * 4/1971 | Loyd et al. | 29/470.3 |
| 3,699,639 A | * 10/1972 | Ditto et al. | 29/470.3 |
| 3,745,641 A | * 7/1973 | Paolini | 29/470.3 |
| 3,853,258 A | * 12/1974 | Louw et al. | 228/2 |
| 4,063,676 A | * 12/1977 | Lilly | 228/114 |
| 4,078,986 A | 3/1978 | Smith | |
| 4,087,038 A | * 5/1978 | Yagi | 228/112 |
| 4,116,805 A | 9/1978 | Ichisaka et al. | |
| 4,234,120 A | * 11/1980 | Pringle | 228/173 |
| 4,553,690 A | * 11/1985 | Nakamura | 29/159 R |
| 4,604,307 A | 8/1986 | Spreeuwers | |
| 4,686,864 A | * 8/1987 | Roseliep | 74/431 |
| 4,850,772 A | * 7/1989 | Jenkins | 411/171 |
| 4,890,782 A | 1/1990 | Nakai et al. | |
| 4,950,557 A | 8/1990 | Nakai et al. | |
| 4,964,564 A | 10/1990 | Neal et al. | |
| 5,154,340 A | * 10/1992 | Peacock | 228/112 |
| 5,271,287 A | 12/1993 | Wadleigh | |
| 5,314,106 A | 5/1994 | Ambroziak et al. | |
| 5,492,264 A | 2/1996 | Wadleigh | |
| 5,766,778 A | 6/1998 | Deicke et al. | |
| 6,027,529 A | 2/2000 | Roychowdury et al. | |
| 6,079,609 A | * 6/2000 | Fochtman | 228/113 |

FOREIGN PATENT DOCUMENTS

| | | | | |
|---|---|---|---|---|
| JP | 53-53554 A | * 5/1978 | | 228/112 |
| RU | 1337220 A | * 9/1987 | | 228/112 |

* cited by examiner

Primary Examiner—Tom Dunn
Assistant Examiner—L. Edmondson
(74) Attorney, Agent, or Firm—R. Craig Armstrong

(57) ABSTRACT

A method of welding an assembly comprising two aligned cylindrical end pieces and an interposed transverse intermediate piece, the method comprising friction welding the end pieces to the intermediate piece, where the intermediate piece is held in a cavity of a holder. The intermediate piece is made from strip stock and has a non-round profile to form radially protruding ears, the ears contacting the correspondingly shaped cavity in the holder.

7 Claims, 4 Drawing Sheets

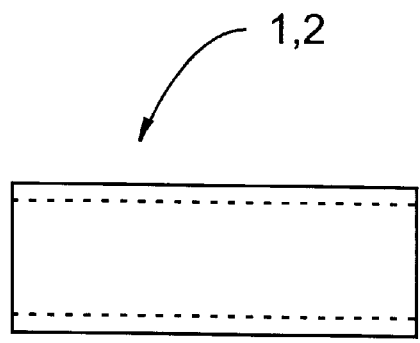
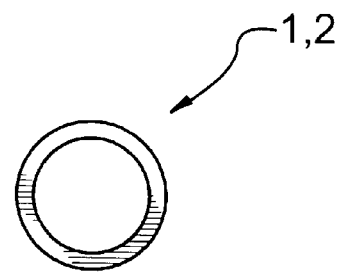
FIG.4A                    FIG.4B
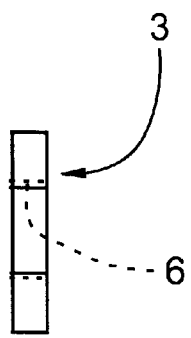
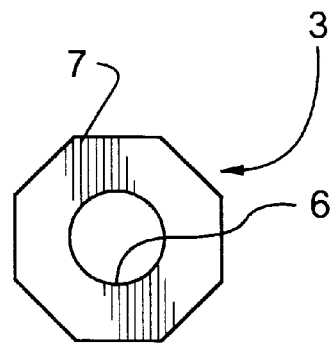
FIG.5A                    FIG.5B

THIN INTERLAYER FRICTION WELDING

REFERENCE TO RELATED APPLICATION

This is a formal application based on and claiming the benefit of provisional application Ser. No. 60/166,310, filed Nov. 19, 1999.

BACKGROUND OF THE INVENTION

This invention relates to a method for using friction and/or inertia welding to produce a welded assembly with a thin interlayer between two similar or dissimilar components, especially for use in automotive brake systems and other applications. The term "friction welding" as used in this description, is considered to include both direct drive friction welding as well as inertia welding.

In automotive brake systems, for example, it is necessary to manufacture a sleeve blank (for further machining) incorporating magnetic carbon steel material on each end with a thin layer of non-magnetic stainless steel between the magnetic materials. Other applications exist where bimetallic and tri-metallic assemblies are required with the interlayer material being very thin, compared to the length of the end pieces. It is required that the thin interlayer material thickness (after assembly) and position relative the end pieces be precisely controlled.

SUMMARY OF THE INVENTION

It is an object of the invention to provide a welded assembly which is easy to manufacture and which comprises bi-metallic or tri-metallic combinations of welded together components.

In the invention a method of welding an assembly, comprising two aligned cylindrical end pieces and an interposed transverse intermediate piece, utilizes friction welding to affix the end pieces to the intermediate piece.

The intermediate piece is held in a cavity of a holder during the welding operation. The intermediate piece is made from strip stock and has a non-round profile to form radially protruding ears, which contact the correspondingly shaped cavity in the holder.

The intermediate piece preferably has a base circle diameter which is sufficiently larger than the end piece diameter, to minimize the burnoff of the intermediate piece, and therefor precisely control the final thickness of the intermediate piece in the welded assembly.

Advantageously, one of the end pieces is friction welded to one side of the intermediate piece, and then the other of the end pieces is friction welded to the other side of the intermediate piece. Alternatively, the end pieces are friction welded to opposite sides of the intermediate piece simultaneously.

The end pieces are either tubular or solid bars, and the intermediate piece either has a central hole or is solid, depending upon the application of the assembly.

BRIEF DESCRIPTION OF THE DRAWINGS

In order that the invention may be more clearly understood, the preferred embodiment thereof will now be described in detail by way of example, with reference to the accompanying drawings, in which:

FIG. 4A is a schematic side view of a tubular end piece according to the invention, FIG. 4B is a schematic end view of a tubular end piece according to the invention, FIG. 5A is a schematic side view of a holed intermediate piece according to the invention, FIG. 5B is a schematic end view of the holed intermediate piece according to FIG. 5A.

DETAILED DESCRIPTION OF THE PREFERRED EMBODIMENT

Figure 1:
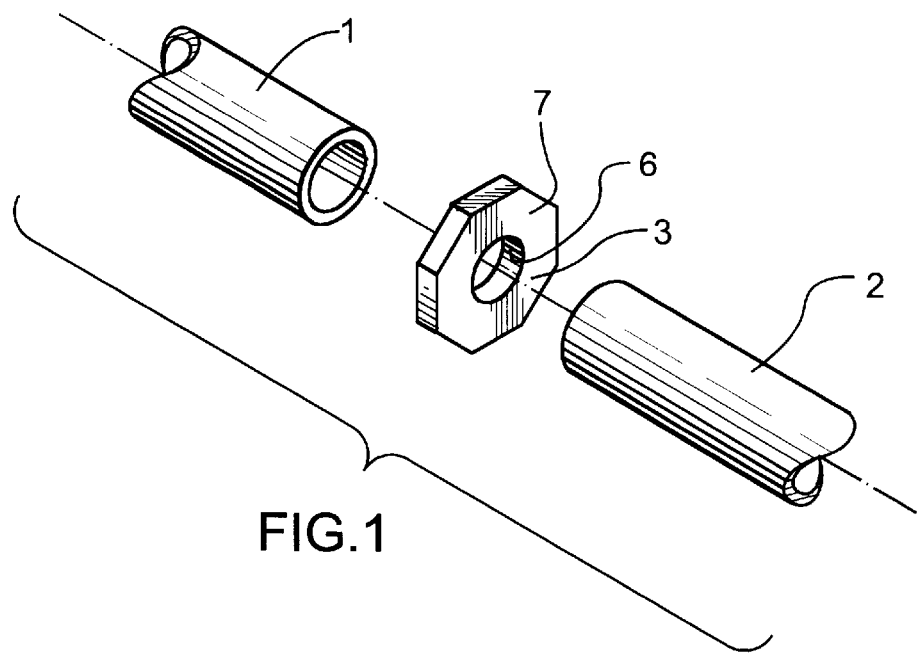
FIG. 1 is a schematic elevated perspective view of two tubular end pieces and a holed intermediate piece as aligned before joining.
Figure 2A:
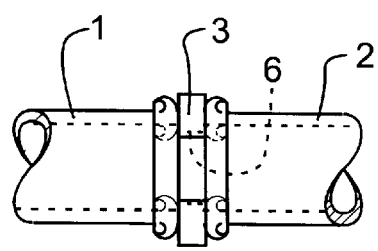
FIG. 2A is a schematic side view of a fully formed joint between two tubular end pieces and a holed intermediate piece.
Figure 2B:
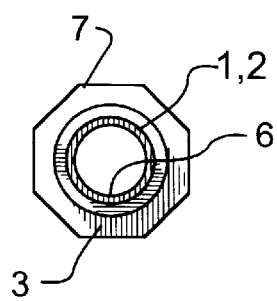
FIG. 2B is a schematic end view of a fully formed joint between two tubular end pieces and a holed intermediate piece.

In a first embodiment of the invention, as shown in FIGS. 1 to 5B, a first tubular end piece 1 and a second tubular end piece 2 are joined together with a holed intermediate piece 3, forming a secure joint. The end pieces are preferably bar shaped and of any suitable cross-section, such as round, hexagonal or square, preferably round. The intermediate piece 3 is preferably derived from sheet stock, for instance by cutting, blanking or stamping, and preferably has a central hole 6. A typical application would be using magnetic material end pieces joined by a non-metallic intermediate piece to form a gap in the magnetic field.

The magnetic material first end piece 1 and second end piece 2 (FIGS. 4A and 4B), or other end pieces that typically are longer than the interlayer material, preferably magnetic steel, are preferably conventionally cut to a length equal to their final required length, plus expected weld burnoff loss of that component.

The non-magnetic, or other material preferably stainless steel, interlayer material (thin substrate or intermediate piece 3, FIGS. 5A and 5B) is preferably manufactured in rolled strip form, and blanked or stamped out into square, hex, or any other appropriate shape and dimension, with base circle dimension equal or larger than opposing component diameter (the diameter of the end pieces), so that it will fit into a cavity or nest 5 (FIG. 3) on a welder holder 4, for the application of torque during the weld process by connecting the holder to a welding machine, for example a chuck (not shown) for spinning the holder during the welding operation or a stationary clamping device (not shown) for keeping the holder still during the welding operation. The intermediate piece is shown as an octagonal cross-section piece 3 in FIGS. 1, 2B, 5A and 5B, and as a hexagonal cross-section piece 3' in FIG. 3. The actual cross-section of the intermediate piece 3 is non-critical, as long as sufficient grip can be provided to hold it securely for either spinning or holding still during the welding operation.

The thickness of the rolled strip, or similarly produced blank, when manufactured, is made equal to the required final interlayer thickness, plus the expected burnoff loss of that component from the two welds to be made to that interlayer material component.

Figure 3:
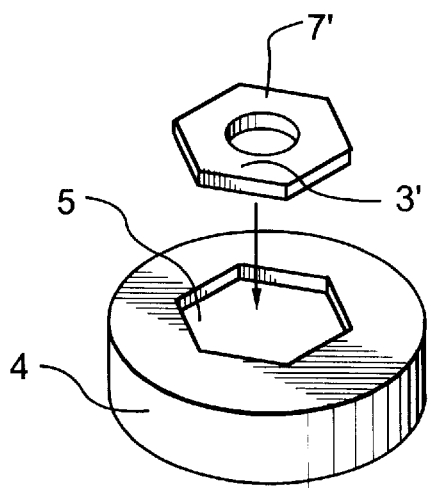
FIG. 3 is a schematic elevated perspective view of a holder for an intermediate piece according to a first embodiment of the invention.
Figure 6:
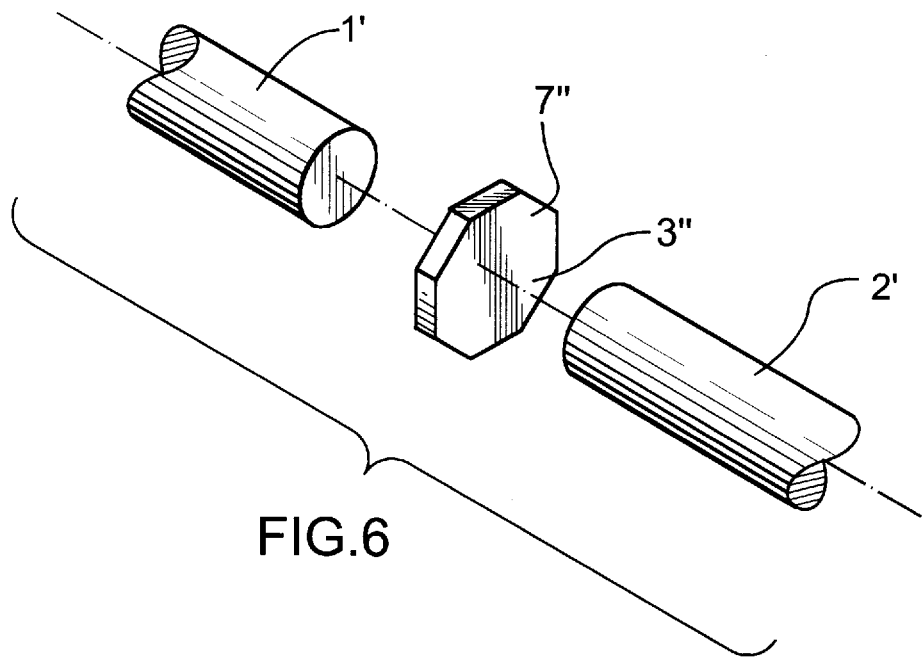
FIG. 6 is a schematic elevated perspective view of two bar end pieces and an intermediate piece as aligned before joining.
Figure 7A:
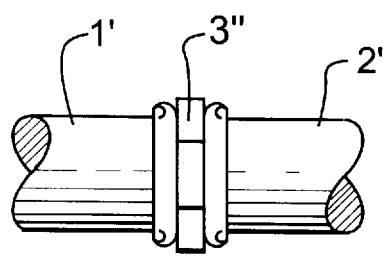
FIG. 7A is a schematic side view of a fully formed joint between two bar end pieces and an intermediate piece.
Figure 7B:
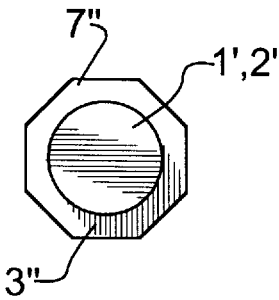
FIG. 7B is a schematic end view of a fully formed joint between two bar end pieces and an intermediate piece.
Figure 8:
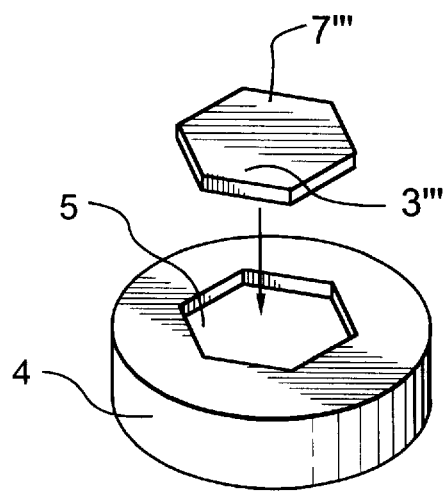
FIG. 8 is a schematic elevated perspective view of a holder for an intermediate piece according to a second embodiment of the invention.
Figure 9A:
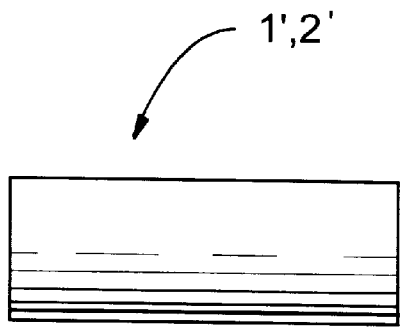
FIG. 9A is a schematic side view of a bar end piece according to the invention.
Figure 9B:
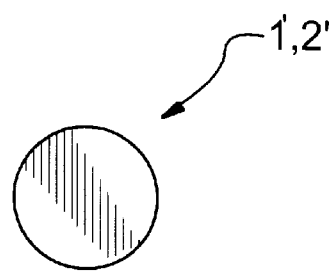
FIG. 9B is a schematic end view of a bar end piece according to the invention.
Figure 10A:
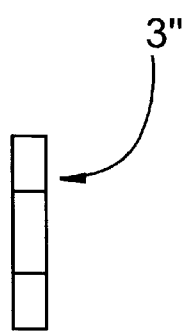
FIG. 10A is a schematic side view of a solid intermediate piece according to the invention.
Figure 10B:
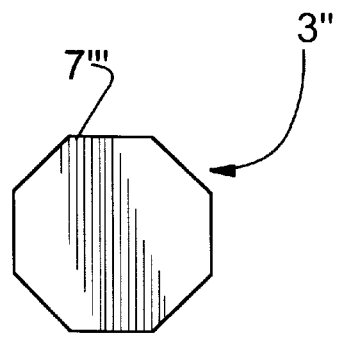
FIG. 10B is a schematic end view of the intermediate piece according to FIG. 10A.

Friction and/or inertia welding is used to weld the end pieces to each side of the intermediate piece 3'. The intermediate piece is preferably held in the holder 4, as shown in FIG. 3, located in the cavity or nest 5 for one or both welds, producing a suitable controlled dimension blank ready for further machining.

The protruding ears 7, 7' of the interlayer material if left in place will give a datum reference position of that interlayer for further machining reference.

When friction andlor inertia welding is used to make a differential diameter (bar to plate) weld, 90% or more of the weld upset (loss of length) occurs in the smaller (bar) diameter part with the associated length tolerance also occurring in that smaller (bar) diameter part, leaving the thin interlayer material thickness precisely controlled. Thus, when the intermediate piece base circle is appropriately larger than the end piece diameter, the end pieces show larger burnoff than the intermediate piece. In the invention, the intermediate piece thickness is chosen to be close to the desired final interlayer thickness, plus the expected burnoff of the intermediate piece (which burnoff is minimal using a method according to the invention).

According to a second embodiment of the invention, as shown in FIGS. 6 to 10B, the first end piece 1' and the second end piece 2' are solid bars and the intermediate piece 3" is also solid, that is, it has no central hole. All other features are the same as described for the first embodiment of the invention. The intermediate piece has ears 7". The intermediate piece is shown as an octagonal cross-section piece 3' in FIGS. 6, 7B, 10A and 10B, and as a hexagonal cross-section piece 3'" in FIG. 8. The two embodiments are similar, except that one uses "pre-drilled" pieces and the other requires any central longitudinal hole to be formed after the welding process.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed as the invention is:

1. A method of welding an assembly comprising two aligned magnetic cylindrical end pieces and an interposed transverse non-magnetic intermediate piece to create an artificial air gap of precisely controlled dimension, said method comprising friction welding said end pieces to said intermediate piece, wherein said intermediate piece is held in a cavity of a holder and said intermediate piece is stamped from strip stock and said intermediate piece further has a non-round profile to form radially protruding ears, said ears contacting said correspondingly shaped cavity in said holder, and wherein said intermediate piece has a base circle diameter which is sufficiently larger than the end piece diameter to minimize the burnoff of said intermediate piece, and therefor precisely control the final thickness of said intermediate piece in said welded assembly.

2. The method as recited in claim 1, wherein one of said end pieces is friction welded to one side of said intermediate piece, and then the other of said end pieces is friction welded to the other side of said intermediate piece.

3. The method as recited in claim 1, wherein said end pieces are friction welded to opposite sides of said intermediate piece simultaneously.

4. The method as recited in claim 1, wherein said end pieces are tubular.

5. The method as recited in claim 1, wherein said end pieces are solid bars.

6. The method as recited in claim 1, wherein said intermediate piece has a central hole.

7. The method as recited in claim 1, wherein said intermediate piece piece is solid.

* * * * *